US010250864B2

(12) United States Patent
Barkatullah

(10) Patent No.: US 10,250,864 B2
(45) Date of Patent: Apr. 2, 2019

(54) METHOD AND APPARATUS FOR GENERATING ENHANCED 3D-EFFECTS FOR REAL-TIME AND OFFLINE APPLICATIONS

(71) Applicant: VEFXi Corporation, Hillsboro, OR (US)

(72) Inventor: Javed Sabir Barkatullah, Portland, OR (US)

(73) Assignee: VEFXi Corporation, North Plains, OR (US)

( * ) Notice: Subject to any disclaimer, the term of this patent is extended or adjusted under 35 U.S.C. 154(b) by 0 days.

(21) Appl. No.: 15/855,756

(22) Filed: Dec. 27, 2017

(65) Prior Publication Data

US 2018/0139432 A1  May 17, 2018

Related U.S. Application Data

(63) Continuation of application No. 14/522,278, filed on Oct. 23, 2014.
(Continued)

(51) Int. Cl.
*H04N 13/128* (2018.01)
*H04N 13/02* (2006.01)
*H04N 13/261* (2018.01)

(52) U.S. Cl.
CPC ......... *H04N 13/128* (2018.05); *H04N 13/026* (2013.01); *H04N 13/261* (2018.05)

(58) Field of Classification Search
CPC .................. H04N 13/0018; H04N 13/0022
See application file for complete search history.

(56) References Cited

U.S. PATENT DOCUMENTS

| 4,180,313 A | 12/1979 | Innuiya |
|---|---|---|
| 5,465,175 A | 11/1995 | Woodgate et al. |

(Continued)

FOREIGN PATENT DOCUMENTS

| WO | 2012068532 A2 | 5/2012 |
|---|---|---|
| WO | 2013109252 A1 | 7/2013 |
| WO | 2015026017 A1 | 2/2015 |

OTHER PUBLICATIONS

International Search Report and Written Opinion, PCT International Patent App. No. PCT/US2016/061313, Craig Peterson, dated Jan. 19, 2017, 22 pgs.
(Continued)

*Primary Examiner* — William C Vaughn, Jr.
*Assistant Examiner* — Jerry T Jean Baptiste
(74) *Attorney, Agent, or Firm* — Chernoff, Vilhauer, McClung & Stenzel, LLP

(57) ABSTRACT

A method for adjusting and generating enhanced 3D-effects for 2D to 3D image and video conversion applications includes controlling a depth location of a zero parallax plane within a depth field of an image scene to adjust parallax of objects in the image scene, controlling a depth volume of objects in the image scene to one of either exaggerate or reduce 3D-effect of the image scene, controlling a depth location of a segmentation plane within the depth field of the image scene, dividing the objects in the image scene into a foreground group and a background group, selectively increasing or decreasing depth volume of objects in the foreground group, selectively increasing or decreasing depth separation of objects in the foreground group relative to the objects in the background group, and generating an updated depth map file for a 2D-image.

15 Claims, 8 Drawing Sheets

Related U.S. Application Data

(60) Provisional application No. 61/897,787, filed on Oct. 30, 2013.

(56) References Cited

U.S. PATENT DOCUMENTS

| | | |
|---|---|---|
| 5,650,876 A | 7/1997 | Davies et al. |
| 5,654,810 A | 8/1997 | Okamura et al. |
| 5,663,831 A | 9/1997 | Mashitani et al. |
| 5,731,853 A | 3/1998 | Taketomi et al. |
| 5,731,899 A | 3/1998 | Meyers |
| 5,751,383 A | 5/1998 | Yamanaka |
| 5,757,545 A | 5/1998 | Wu et al. |
| 5,771,121 A | 6/1998 | Hentschke |
| 5,781,229 A | 7/1998 | Zediker et al. |
| 5,808,797 A | 9/1998 | Bloom et al. |
| 5,822,125 A | 10/1998 | Meyers |
| 5,825,552 A | 10/1998 | Kurtz et al. |
| 5,831,765 A | 11/1998 | Nakayama et al. |
| 5,841,579 A | 11/1998 | Bloom et al. |
| 5,852,512 A | 12/1998 | Chikazawa |
| 5,855,425 A | 1/1999 | Hamagishi |
| 5,864,375 A | 1/1999 | Taketomi et al. |
| 5,894,364 A | 4/1999 | Nagatani |
| 5,896,225 A | 4/1999 | Chikazawa |
| 5,914,805 A | 6/1999 | Crowley |
| 5,943,166 A | 8/1999 | Hoshi et al. |
| 5,969,850 A | 10/1999 | Harrold et al. |
| 5,969,872 A | 10/1999 | Ben Oren et al. |
| 5,982,553 A | 11/1999 | Bloom et al. |
| 5,986,804 A | 11/1999 | Mashitani et al. |
| 5,991,074 A | 11/1999 | Nose et al. |
| 5,993,003 A | 11/1999 | McLaughlin |
| 5,993,004 A | 11/1999 | Moseley et al. |
| 6,014,164 A | 1/2000 | Woodgate et al. |
| 6,014,187 A | 1/2000 | Taketomi et al. |
| 6,020,931 A | 2/2000 | Bilbrey et al. |
| 6,040,807 A | 3/2000 | Hamagishi et al. |
| 6,048,081 A | 4/2000 | Richardson |
| 6,049,352 A | 4/2000 | Allio |
| 6,061,083 A | 5/2000 | Aritake et al. |
| 6,064,424 A | 5/2000 | van Berkel et al. |
| 6,088,102 A | 7/2000 | Manhart |
| 6,097,554 A | 8/2000 | Watkins |
| 6,101,036 A | 8/2000 | Bloom |
| 6,130,770 A | 10/2000 | Bloom |
| 6,151,062 A | 11/2000 | Inoguchi et al. |
| 6,157,402 A | 12/2000 | Torgeson |
| 6,188,518 B1 | 2/2001 | Martin |
| 6,215,579 B1 | 4/2001 | Bloom et al. |
| 6,215,590 B1 | 4/2001 | Okano |
| 6,219,184 B1 | 4/2001 | Nagatani |
| 6,224,214 B1 | 5/2001 | Martin et al. |
| 6,254,246 B1 | 7/2001 | Tiao et al. |
| 6,259,450 B1 | 7/2001 | Chiabrera et al. |
| 6,266,106 B1 | 7/2001 | Murata et al. |
| 6,266,176 B1 | 7/2001 | Anderson et al. |
| 6,271,808 B1 | 8/2001 | Corbin |
| 6,304,263 B1 | 10/2001 | Chiabrera et al. |
| 6,337,721 B1 | 1/2002 | Hamagishi et al. |
| 6,381,072 B1 | 4/2002 | Burger |
| 6,385,882 B1 | 5/2002 | Conley et al. |
| 6,388,815 B1 | 5/2002 | Collins, Jr. et al. |
| 6,445,406 B1 | 9/2002 | Taniguchi et al. |
| 6,462,871 B1 | 10/2002 | Morishima |
| 6,481,849 B2 | 11/2002 | Martin et al. |
| 6,525,889 B1 | 2/2003 | Collins, Jr. et al. |
| 6,533,420 B1 | 3/2003 | Eichenlaub |
| 6,547,628 B1 | 4/2003 | Long |
| 6,574,047 B2 | 6/2003 | Hawver |
| 6,674,939 B1 | 1/2004 | Anderson et al. |
| 6,697,042 B1 | 2/2004 | Cohen et al. |
| 6,700,701 B1 | 3/2004 | Son et al. |
| 6,707,591 B2 | 3/2004 | Amm |
| 6,712,480 B1 | 3/2004 | Leung et al. |
| 6,714,173 B2 | 3/2004 | Shinoura |
| 6,724,951 B1 | 4/2004 | Anderson et al. |
| 6,727,866 B2 | 4/2004 | Wang et al. |
| 6,728,023 B1 | 4/2004 | Alioshin et al. |
| 6,736,512 B2 | 5/2004 | Balogh |
| 6,747,781 B2 | 6/2004 | Trisnadi |
| 6,760,140 B1 | 7/2004 | Argueta-Diaz et al. |
| 6,764,875 B2 | 7/2004 | Shook |
| 6,766,073 B1 | 7/2004 | Anderson |
| 6,767,751 B2 | 7/2004 | Hunter |
| 6,775,048 B1 | 8/2004 | Starkweather et al. |
| 6,782,205 B2 | 8/2004 | Trisnadi et al. |
| 6,791,570 B1 | 9/2004 | Schwerdtner et al. |
| 6,795,250 B2 | 9/2004 | Johnson et al. |
| 6,800,238 B1 | 10/2004 | Miller |
| 6,801,354 B1 | 10/2004 | Payne et al. |
| 6,806,997 B1 | 10/2004 | Dueweke et al. |
| 6,813,059 B2 | 11/2004 | Hunter et al. |
| 6,822,797 B1 | 11/2004 | Carlisle et al. |
| 6,829,077 B1 | 12/2004 | Maheshwari |
| 6,829,092 B2 | 12/2004 | Amm et al. |
| 6,829,258 B1 | 12/2004 | Carlisle et al. |
| 6,877,882 B1 | 4/2005 | Haven et al. |
| 7,139,042 B2 | 11/2006 | Nam et al. |
| 7,154,653 B2 | 12/2006 | Kean et al. |
| 7,161,614 B1 | 1/2007 | Yamashita et al. |
| 7,168,249 B2 | 1/2007 | Starkweather et al. |
| 7,215,474 B2 | 5/2007 | Argueta-Diaz |
| 7,236,238 B1 | 6/2007 | Durresi et al. |
| 7,271,945 B2 | 9/2007 | Hagood et al. |
| 7,286,280 B2 | 10/2007 | Whitehead et al. |
| 7,295,264 B2 | 11/2007 | Kim |
| 7,298,552 B2 | 11/2007 | Redert |
| 7,304,785 B2 | 12/2007 | Hagood et al. |
| 7,304,786 B2 | 12/2007 | Hagood et al. |
| 7,311,607 B2 | 12/2007 | Tedsen et al. |
| 7,365,897 B2 | 4/2008 | Hagood et al. |
| 7,405,852 B2 | 7/2008 | Brosnihan et al. |
| 7,417,782 B2 | 8/2008 | Hagood et al. |
| 7,425,069 B2 | 9/2008 | Schwerdtner et al. |
| 7,430,347 B2 | 9/2008 | Anderson et al. |
| 7,432,878 B1 | 10/2008 | Nayar et al. |
| 7,450,304 B2 | 11/2008 | Sakai et al. |
| 7,502,159 B2 | 3/2009 | Hagood, IV et al. |
| 7,518,663 B2 | 4/2009 | Cornelissen |
| 7,551,344 B2 | 6/2009 | Hagood et al. |
| 7,551,353 B2 | 6/2009 | Kim et al. |
| 7,614,748 B2 | 11/2009 | Nayar et al. |
| 7,616,368 B2 | 11/2009 | Hagood, IV |
| 7,619,806 B2 | 11/2009 | Hagood, IV et al. |
| 7,630,598 B2 | 12/2009 | Anderson et al. |
| 7,633,670 B2 | 12/2009 | Anderson et al. |
| 7,636,189 B2 | 12/2009 | Hagood, IV et al. |
| 7,651,282 B2 | 1/2010 | Zomet et al. |
| 7,660,499 B2 | 2/2010 | Anderson et al. |
| 7,675,665 B2 | 3/2010 | Hagood et al. |
| 7,703,924 B2 | 4/2010 | Nayar |
| 7,742,016 B2 | 6/2010 | Hagood et al. |
| 7,746,529 B2 | 6/2010 | Hagood et al. |
| 7,750,982 B2 | 7/2010 | Nelson et al. |
| 7,755,582 B2 | 7/2010 | Hagood et al. |
| 7,817,045 B2 | 10/2010 | Onderko |
| 7,839,356 B2 | 11/2010 | Hagood et al. |
| 7,852,546 B2 | 12/2010 | Fijol et al. |
| 7,857,700 B2 | 12/2010 | Wilder et al. |
| 7,864,419 B2 | 1/2011 | Cossairt et al. |
| 7,876,489 B2 | 1/2011 | Gandhi et al. |
| 7,889,425 B2 | 2/2011 | Connor |
| 7,891,815 B2 | 2/2011 | Nayar et al. |
| 7,911,671 B2 | 3/2011 | Rabb |
| 7,927,654 B2 | 4/2011 | Hagood et al. |
| 7,978,407 B1 | 7/2011 | Connor |
| 8,134,779 B2 | 3/2012 | Roh et al. |
| 8,149,348 B2 | 4/2012 | Yun et al. |
| 8,159,428 B2 | 4/2012 | Hagood et al. |
| 8,174,632 B2 | 5/2012 | Kim et al. |
| 8,179,424 B2 | 5/2012 | Moller |
| 8,189,039 B2 | 5/2012 | Hiddink et al. |
| 8,242,974 B2 | 8/2012 | Yamazaki et al. |
| 8,248,560 B2 | 8/2012 | Kim et al. |

(56) References Cited

U.S. PATENT DOCUMENTS

| | | |
|---|---|---|
| 8,262,274 B2 | 9/2012 | Kim et al. |
| 8,310,442 B2 | 11/2012 | Hagood et al. |
| 8,363,100 B2 | 1/2013 | Lu |
| 8,402,502 B2 | 3/2013 | Meuninck et al. |
| 8,441,602 B2 | 5/2013 | Kim et al. |
| 8,446,559 B2 | 5/2013 | Kim et al. |
| 8,482,496 B2 | 7/2013 | Lewis |
| 8,519,923 B2 | 8/2013 | Hagood, IV et al. |
| 8,519,945 B2 | 8/2013 | Hagood et al. |
| 8,520,285 B2 | 8/2013 | Fike, III et al. |
| 8,526,096 B2 | 9/2013 | Steyn et al. |
| 8,545,048 B2 | 10/2013 | Kang et al. |
| 8,545,084 B2 | 10/2013 | Kim et al. |
| 8,558,961 B2 | 10/2013 | Yun et al. |
| 8,587,498 B2 | 11/2013 | Connor |
| 8,587,635 B2 | 11/2013 | Hines et al. |
| 8,593,574 B2 | 11/2013 | Ansari et al. |
| 8,599,463 B2 | 12/2013 | Wu et al. |
| 8,640,182 B2 | 1/2014 | Bedingfield, Sr. |
| 8,651,684 B2 | 2/2014 | Mehrle |
| 8,651,726 B2 | 2/2014 | Robinson |
| 8,659,830 B2 | 2/2014 | Brott et al. |
| 8,675,125 B2 | 3/2014 | Cossairt et al. |
| 8,711,062 B2 | 4/2014 | Yamazaki et al. |
| 8,736,675 B1 | 5/2014 | Holzbach et al. |
| 8,786,685 B1 | 7/2014 | Sethna et al. |
| 8,817,082 B2 | 8/2014 | Van Der Horst et al. |
| 8,860,790 B2 | 10/2014 | Ericson et al. |
| 8,891,152 B2 | 11/2014 | Fike, III et al. |
| 8,897,542 B2 | 11/2014 | Wei |
| 8,917,441 B2 | 12/2014 | Woodgate et al. |
| 8,918,831 B2 | 12/2014 | Meuninck et al. |
| 8,937,767 B2 | 1/2015 | Chang et al. |
| 8,947,385 B2 | 2/2015 | Ma et al. |
| 8,947,497 B2 | 2/2015 | Hines et al. |
| 8,947,511 B2 | 2/2015 | Friedman |
| 8,964,009 B2 | 2/2015 | Yoshida |
| 8,988,343 B2 | 3/2015 | Fei et al. |
| 8,994,716 B2 | 3/2015 | Malik |
| 9,001,423 B2 | 4/2015 | Woodgate et al. |
| 9,024,927 B2 | 5/2015 | Koyama |
| 9,030,522 B2 | 5/2015 | Hines et al. |
| 9,030,536 B2 | 5/2015 | King et al. |
| 9,032,470 B2 | 5/2015 | Meuninck et al. |
| 9,049,426 B2 | 6/2015 | Costa et al. |
| 9,082,353 B2 | 7/2015 | Lewis et al. |
| 9,086,778 B2 | 7/2015 | Friedman |
| 9,087,486 B2 | 7/2015 | Gandhi et al. |
| 9,116,344 B2 | 8/2015 | Wu et al. |
| 9,128,277 B2 | 9/2015 | Steyn et al. |
| 9,134,552 B2 | 9/2015 | Ni Chleirigh et al. |
| 9,135,868 B2 | 9/2015 | Hagood, IV et al. |
| 9,158,106 B2 | 10/2015 | Hagood et al. |
| 9,160,968 B2 | 10/2015 | Hines et al. |
| 9,167,205 B2 | 10/2015 | Hines et al. |
| 9,176,318 B2 | 11/2015 | Hagood et al. |
| 9,177,523 B2 | 11/2015 | Hagood et al. |
| 9,182,587 B2 | 11/2015 | Brosnihan et al. |
| 9,182,604 B2 | 11/2015 | Cossairt et al. |
| 9,188,731 B2 | 11/2015 | Woodgate et al. |
| 9,229,222 B2 | 1/2016 | Hagood et al. |
| 9,232,274 B2 | 1/2016 | Meuninck et al. |
| 9,235,057 B2 | 1/2016 | Robinson et al. |
| 9,237,337 B2 | 1/2016 | Ramsey et al. |
| 9,243,774 B2 | 1/2016 | Kim et al. |
| 9,247,228 B2 | 1/2016 | Malik |
| 9,250,448 B2 | 2/2016 | Robinson |
| 9,261,641 B2 | 2/2016 | Sykora et al. |
| 9,261,694 B2 | 2/2016 | Payne et al. |
| 2003/0067421 A1 | 4/2003 | Sullivan |
| 2003/0197933 A1 | 10/2003 | Sudo et al. |
| 2004/0165264 A1 | 8/2004 | Uehara et al. |
| 2004/0174604 A1 | 9/2004 | Brown |
| 2004/0192430 A1 | 9/2004 | Burak et al. |
| 2005/0059487 A1 | 3/2005 | Wilder et al. |
| 2005/0083400 A1 | 4/2005 | Hirayama et al. |
| 2005/0111100 A1 | 5/2005 | Mather et al. |
| 2005/0190443 A1 | 9/2005 | Nam et al. |
| 2006/0023065 A1 | 2/2006 | Alden |
| 2006/0039181 A1 | 2/2006 | Yang et al. |
| 2006/0044987 A1 | 3/2006 | Anderson et al. |
| 2006/0078180 A1 | 4/2006 | Berretty |
| 2006/0244918 A1 | 11/2006 | Cossairt et al. |
| 2007/0146358 A1 | 6/2007 | Ijzerman |
| 2007/0165305 A1 | 7/2007 | Mehrle |
| 2007/0222954 A1 | 9/2007 | Hattori |
| 2007/0229778 A1 | 10/2007 | Cha et al. |
| 2007/0255139 A1 | 11/2007 | Deschinger et al. |
| 2007/0268590 A1 | 11/2007 | Schwerdtner |
| 2008/0079662 A1 | 4/2008 | Saishu et al. |
| 2008/0094853 A1 | 4/2008 | Kim et al. |
| 2008/0123182 A1 | 5/2008 | Cernasov |
| 2008/0204550 A1 | 8/2008 | De Zwart et al. |
| 2008/0211734 A1 | 9/2008 | Huitema et al. |
| 2008/0225114 A1 | 9/2008 | De Zwart et al. |
| 2008/0247042 A1 | 10/2008 | Scwerdtner |
| 2008/0259233 A1 | 10/2008 | Krijn et al. |
| 2008/0281767 A1 | 11/2008 | Garner |
| 2008/0291267 A1 | 11/2008 | Leveco et al. |
| 2008/0316303 A1 | 12/2008 | Chiu et al. |
| 2008/0316604 A1 | 12/2008 | Redert et al. |
| 2009/0002335 A1 | 1/2009 | Chaudhri |
| 2009/0051759 A1 | 2/2009 | Adkins et al. |
| 2009/0217209 A1 | 8/2009 | Chen et al. |
| 2009/0309887 A1 | 12/2009 | Moller et al. |
| 2009/0309958 A1 | 12/2009 | Hamagishi et al. |
| 2010/0007582 A1 | 1/2010 | Zalewski |
| 2010/0026795 A1 | 2/2010 | Moller et al. |
| 2010/0026797 A1 | 2/2010 | Meuwissen et al. |
| 2010/0033813 A1 | 2/2010 | Rogoff |
| 2010/0097687 A1 | 4/2010 | Lipovetskaya et al. |
| 2010/0110316 A1 | 5/2010 | Huang et al. |
| 2010/0165081 A1 | 7/2010 | Jung et al. |
| 2010/0245548 A1 | 9/2010 | Sasaki et al. |
| 2010/0309290 A1 | 12/2010 | Myers |
| 2011/0000971 A1 | 1/2011 | Onderko |
| 2011/0013258 A1 | 1/2011 | Lee et al. |
| 2011/0032483 A1 | 2/2011 | Hruska et al. |
| 2011/0074773 A1 | 3/2011 | Jung |
| 2011/0085094 A1 | 4/2011 | Kao et al. |
| 2011/0109629 A1 | 5/2011 | Ericson et al. |
| 2011/0149030 A1 | 6/2011 | Kang et al. |
| 2011/0188773 A1 | 8/2011 | Wei |
| 2011/0210964 A1 | 9/2011 | Chiu et al. |
| 2011/0234605 A1 | 9/2011 | Smith et al. |
| 2011/0246877 A1 | 10/2011 | Kwak et al. |
| 2011/0249026 A1 | 10/2011 | Singh |
| 2011/0254929 A1 | 10/2011 | Yang et al. |
| 2011/0291945 A1 | 12/2011 | Ewing, Jr. et al. |
| 2011/0316679 A1 | 12/2011 | Pihlaja |
| 2012/0013606 A1 | 1/2012 | Tsai et al. |
| 2012/0019883 A1 | 1/2012 | Chae et al. |
| 2012/0026586 A1 | 2/2012 | Chen |
| 2012/0050262 A1 | 3/2012 | Kim et al. |
| 2012/0057006 A1 | 3/2012 | Joseph et al. |
| 2012/0057229 A1 | 3/2012 | Kikuchi et al. |
| 2012/0062549 A1 | 3/2012 | Woo et al. |
| 2012/0069019 A1 | 3/2012 | Richards |
| 2012/0069146 A1 | 3/2012 | Lee |
| 2012/0081359 A1 | 4/2012 | Lee et al. |
| 2012/0102436 A1 | 4/2012 | Nurmi |
| 2012/0113018 A1 | 5/2012 | Yan |
| 2012/0120063 A1* | 5/2012 | Ozaki ............... H04N 13/0022 345/419 |
| 2012/0154559 A1 | 6/2012 | Voss et al. |
| 2012/0202187 A1 | 8/2012 | Brinkerhoff, III |
| 2012/0206484 A1 | 8/2012 | Hauschild et al. |
| 2012/0223879 A1 | 9/2012 | Winter |
| 2012/0229450 A1 | 9/2012 | Kim et al. |
| 2012/0229519 A1 | 9/2012 | Stallings et al. |
| 2012/0229718 A1 | 9/2012 | Huang et al. |
| 2012/0249836 A1 | 10/2012 | Ali |
| 2012/0256096 A1 | 10/2012 | Heimlicher et al. |
| 2012/0262398 A1 | 10/2012 | Kim et al. |

(56) References Cited

U.S. PATENT DOCUMENTS

| | | |
|---|---|---|
| 2012/0274626 A1 | 11/2012 | Hsieh |
| 2012/0274634 A1 | 11/2012 | Yamada et al. |
| 2013/0027390 A1 | 1/2013 | Kim et al. |
| 2013/0076746 A1* | 3/2013 | Chung ................. H04N 13/128 345/424 |
| 2013/0102249 A1 | 4/2013 | Tanaka |
| 2013/0120543 A1* | 5/2013 | Chen .................... H04N 13/128 348/51 |
| 2013/0202221 A1 | 8/2013 | Tsai |
| 2014/0035902 A1 | 2/2014 | An et al. |
| 2014/0036173 A1 | 2/2014 | Chang |
| 2014/0132726 A1* | 5/2014 | Jung .................. H04N 5/44582 348/46 |
| 2014/0192172 A1 | 7/2014 | Kang et al. |
| 2014/0304310 A1 | 10/2014 | Gerbasi |
| 2014/0355302 A1 | 12/2014 | Wilcox et al. |
| 2015/0070481 A1 | 3/2015 | S. et al. |
| 2015/0185957 A1 | 7/2015 | Weng et al. |
| 2015/0226972 A1 | 8/2015 | Wang |
| 2015/0232065 A1 | 8/2015 | Ricci et al. |
| 2015/0260999 A1 | 9/2015 | Wang et al. |

OTHER PUBLICATIONS

International Bureau of WIPO; International Preliminary Report on Patentability, dated Aug. 30, 2018, for PCT App. No. PCT/US2017/016240 filed Feb. 2, 2017; 8 pages.

* cited by examiner

METHOD AND APPARATUS FOR GENERATING ENHANCED 3D-EFFECTS FOR REAL-TIME AND OFFLINE APPLICATIONS

CROSS-REFERENCE TO RELATED APPLICATIONS

This application is a continuation of U.S. patent application Ser. No. 14/522,278, filed Oct. 23, 2014, which application claims the benefit of U.S. Provisional App. No. 61/897,787, filed Oct. 30, 2013.

BACKGROUND OF THE INVENTION

Embodiments here relate generally to the field of 2D to 3D video and image conversion performed either in real time or offline. More particularly, the embodiments relate to a method and apparatus for enhancing and/or exaggerating depth and negative parallax and adjusting the zero-parallax plane, also referred to as the screen plane, for 3D-image rendering on different 3D display technologies and formats.

With the rising sale of 3D-enabled TVs and personal devices in the consumer segment, the need to release new and old movies in 3D is increasing. In the commercial application space, the use of large screen electronic billboards which can display attention grabbing 3D-images for advertising or informational purposes has increased. Because of the increasing demand for creating 3D-content, the demand for automatically or semi-automatically convert existing 2D-contents to 3D contents increases. Enhancing the 3D-experience of the consumers and viewers can produce further growth of 3D entertainment and advertisement market. A demand exists for tools and services to generate stunning 3D-image effects.

Traditionally, converting 2D videos to 3D for professional application starts with generating a depth map of the image for each video frame using a very labor intensive manual process of roto-scoping, where objects in each frame are manually and painstakingly traced by the artist and depth information for each object is painted by hand. For consumer applications such as built-in automated 2D to 3D function in 3D-TV or game consoles, the converted 3D-image suffers from extremely poor depth and pop-out effects. Moreover, there is no automated control to modify the zero-parallax plane position and artificially exaggerate pop-out or depth of selective objects for enhanced special-effects.

Numerous research publications exist on methods of automatically generating depth map from a mono-ocular 2D-image for the purpose of converting the 2D-image to 3D-image. The methods range from very simplistic heuristics to very complicated and compute intensive image analysis. Simple heuristics may be suitable for real time conversion application but provides poor 3D quality. On the other hand, complex mathematical analysis may provide good 3D-image quality but may not be suitable for real time application and hardware implementation.

A greyscale image represents the depth map of an image in which each pixel is assigned a value between and including 0 and 255. A value of 255 (100% white level) indicates the pixel is in the front most and a value of 0 represents the pixel is in the back most. The depth value of a pixel is used to calculate the horizontal (x-axis) offset of the pixel for left and right eye view images. In particular, if the calculated offset is w for pixel at position (x,y) in the original image, then this pixel is placed at position (x+w, y) in the left image and (x−w, y) in the right image. If the value of the offset w for a pixel is positive, it creates a negative parallax where the pixel appears to pop out of the screen. Alternatively, if the value of the offset w for a pixel is negative, it creates a positive parallax where the pixel appears to be behind the screen plane. If the offset w is zero, the pixel appears on the screen plane. The larger the offset, the greater the disparity between the left and right eye view and hence larger the depth inside the screen or pop out of the screen. Hence, given a depth map for a 2D, or monocular, image, by selectively manipulating the offsets the pixels for 3D rendering, it is possible to artificially enhance or exaggerate 3D effects in a scene and this transformations can be done in real time or offline.

DETAILED DESCRIPTION

Figure 1:
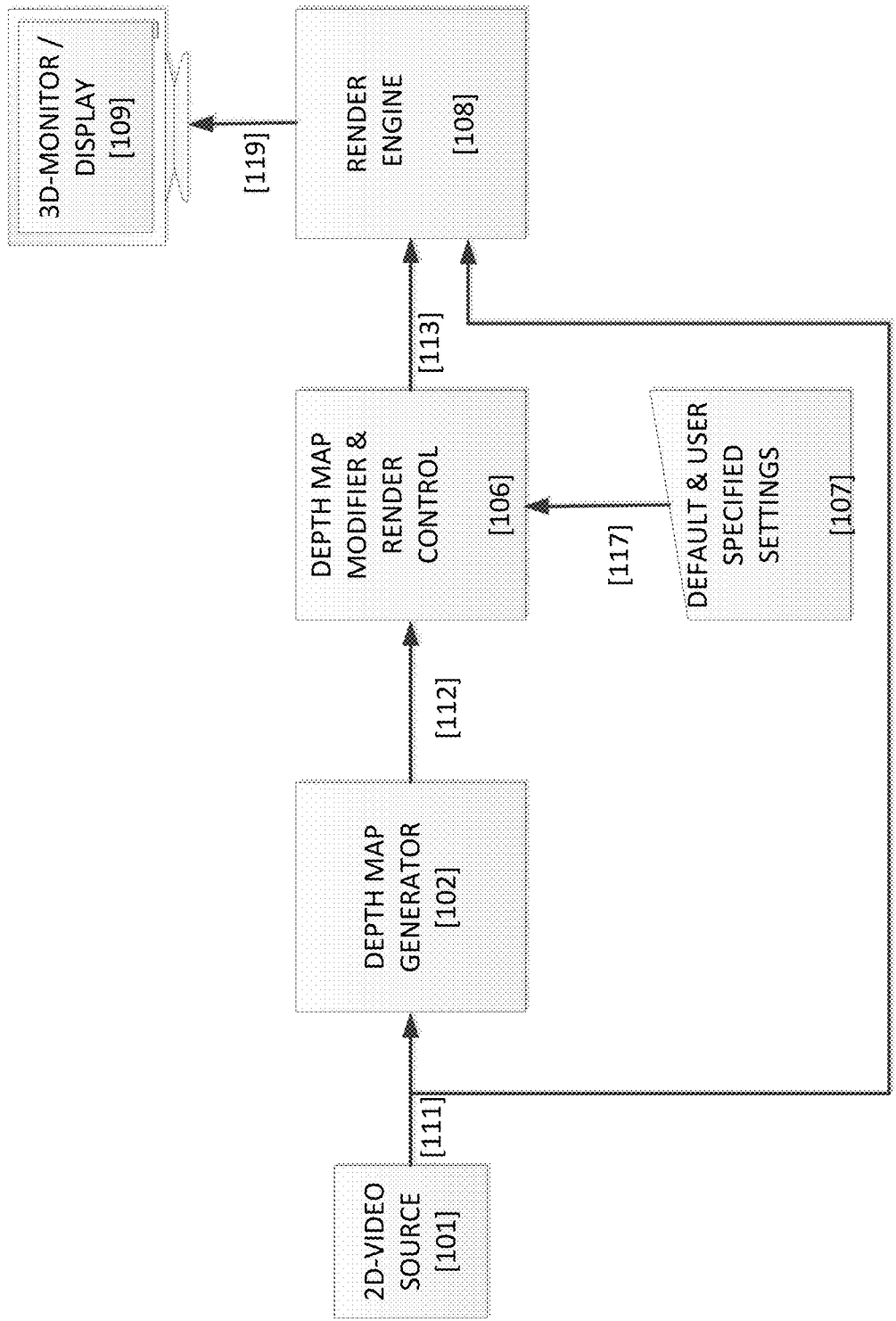
FIG. 1 shows an exemplary block diagram of the system, according to one embodiment of the invention.

Embodiments here relate to a method, apparatus, system, and computer program for modifying, enhancing or exaggerating 3D-image rendered given a mono-ocular (2D) image source and its depth map. In an interactive mode, user can control and change the attributes and quality for 3D-rendition of a 2D-image using graphical user interface (GUI). Optionally, such control settings can be presented to the 3D-render engine as commands stored in a file and read by 3D-rendering application or routine. These attributes and quality of the 3D image are not specific to a particular 3D-format but can be used for all 3D formats including but not limited to various stereo-3D formats and glasses free multi-view auto-stereo formats. The embodiments can take advantage of the computing power of general purpose CPU, GPU or dedicated FPGA or ASIC chip to process sequence of images from video frames of a streaming 2D-video to generate 3D video frames. Depending on the available processing capabilities of the processing unit and complexity of desired transformations, the conversion of 2D video frames to 3D can be done in real.

In one embodiment, the enhanced 3D-experience may be implemented as a software application running on a computing device such as a personal computer, tablet computer or smart-phone. A user receives a streaming 2D-video from the internet or from a file stored on a local storage device. The user then uses the application GUI to adjust the quality and attributes of 3D-video in an automatic 2D video to 3D conversion and display it on the attached 3D display in real time. In one embodiment, the converted enhanced 3D-video can be stored back on the local or network storage device.

In one embodiment, the 2D to 3D conversion process is implemented as a software application running on a computing device such as a personal computer, tablet computer or smart-phone. A user loads a video from a file stored on a local or network attached storage device and uses the application to automatically or in an interactive mode convert the 2D video to 3D and store it back offline on the local or network attached disk. In one embodiment, the user settings for 3D attributes can be stored in a file using some pre-defined syntax such as XML and can be read in by the 2D to 3D conversion application and applied during the rendering of the 3D-video.

In one embodiment, the enhanced 3D render method is implemented in dedicated hardware such as an FPGA or a custom ASIC chip as an independent 3D-render application. In one embodiment, the enhanced 3D render method is implemented in dedicated hardware such as an FPGA or a custom ASIC chip as part of a larger 2D to 3D conversion application. In one embodiment, the enhanced 3D-render video conversion system is implemented as a stand-alone converter box. In one embodiment, the entire 2D to 3D video conversion system is implemented a circuit board or a daughter card. In one embodiment, a stand-alone implantation of the conversion system can be attached to the output of a streaming video receiver, broadcast TV receiver, satellite-TV receiver or cable-TV receiver and the output of standalone converter box can be connected to 3D-displays.

In one embodiment, the enhanced 3D render method is implemented as a software application utilizing the graphics processing unit (GPU) of a computing device such as a personal computer, tablet computer or smart-phone to enhance performance.

In one embodiment, the system receives a 2D image and its depth map either as separately but synchronized fashion or together in a single frame, usually referred to as 2D+D format, and the software or hardware implementation of the enhanced 3D-render method uses that to produce the enhanced 3D-image.

FIG. 1 shows an exemplary block diagram of a 2D to 3D conversion process, according to one embodiment. In one embodiment, the process comprises receiving single or a sequence of image frames. The depth map generator block 102 generates the depth map 112 from the 2D-source image. In one embodiment, the depth map 112 is used by the enhanced 3D-render block 106 that generates a transformed depth map to calculate new pixel displacements by the render engine.

Figure 2:
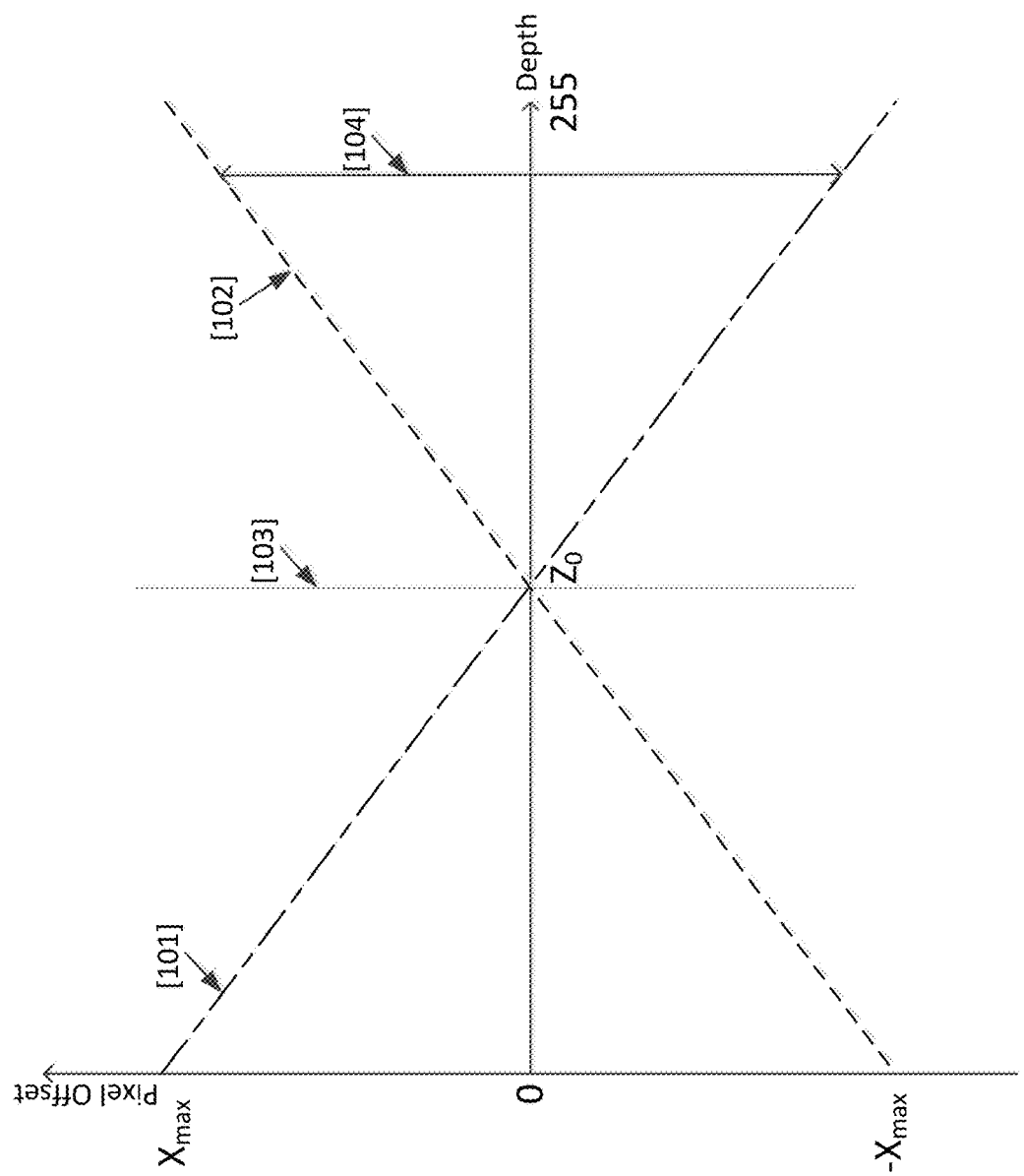
FIG. 2 illustrates an exemplary transformation from a depth value for a pixel in the 2D image to calculate its offset for placement in the left and right eye view images.

FIG. 2 illustrates one embodiment of transformation from pixel depth to pixel offset in 3D-image. Lines 101 and 102 are the linear transformation from depth to offset for the right and left eye view images. 103 represents a plane in the depth field where both the left and right eye view offsets are equal and zero. All objects with depths and hence offsets to the right of this plane will have negative parallax, meaning the object will appear to pop out of the screen. All objects with depths and hence offsets to the left of this plane will have positive parallax, meaning the object will appear to be behind the screen.

Figure 3:
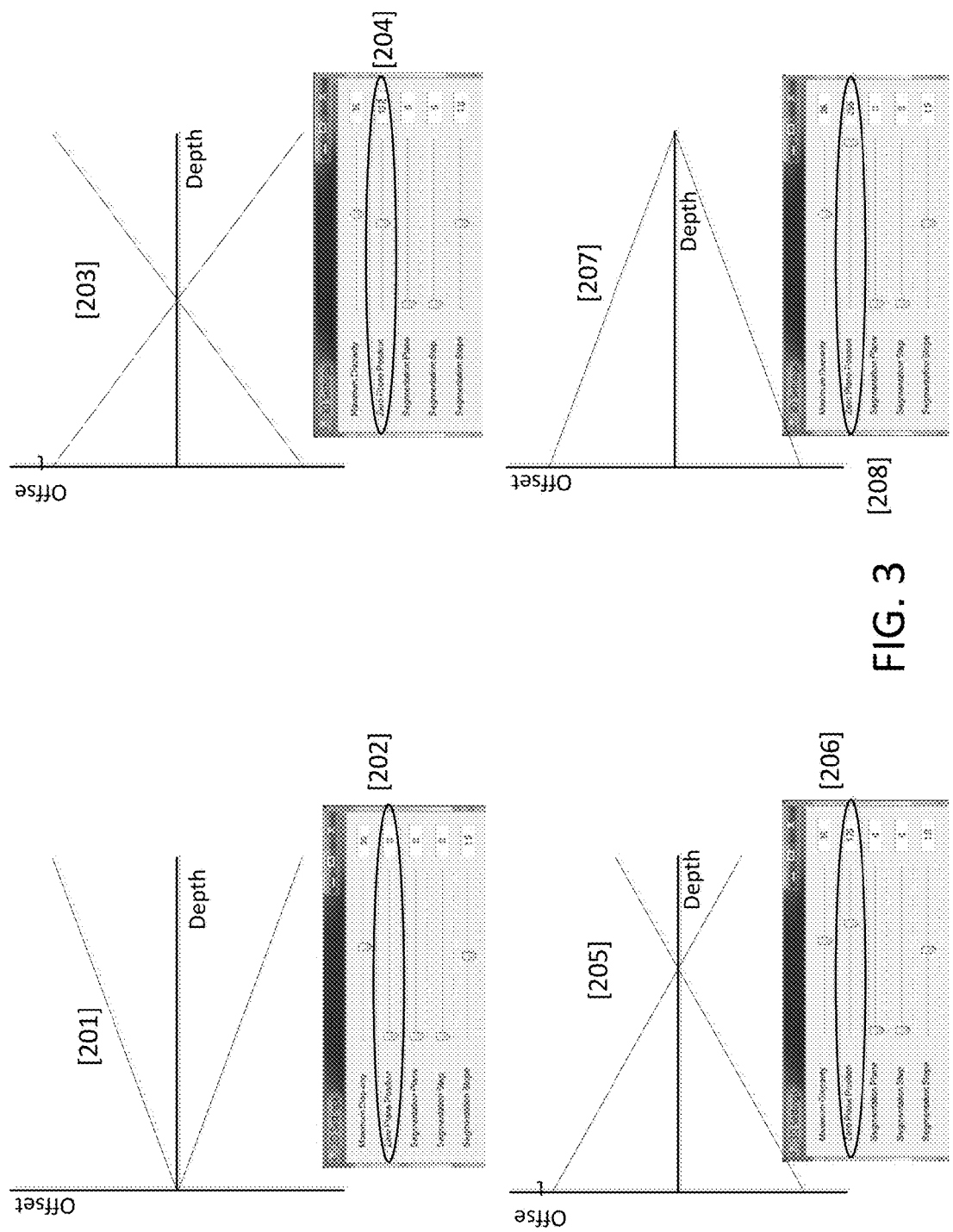
FIG. 3 illustrates with four settings of an exemplary graphical user interface (GUI) where user can move the location of the screen plane (also known as zero plane) in the scene, according to one software embodiment of the invention.

FIG. 3 illustrates one embodiment of graphical user interface (GUI) 202 to enable the user to adjust the location of the zero plane, which is the point in the graph 201 where the two lines meet The GUI 202 shows offset of the zero plane to be zero. Different situations of this GUI are shown with different adjustments represented by the lines above them. GUI 204 shows an offset in which the zero plane position is 127 on the GUI and the graphical representation is shown as 203. Similarly, GUI 206 shows the offset of 170, with the zero plane moving to the right as shown as 205, and GUI 208 shows the offset of 255, with the zero plane to the farthest right position.

Figure 4:
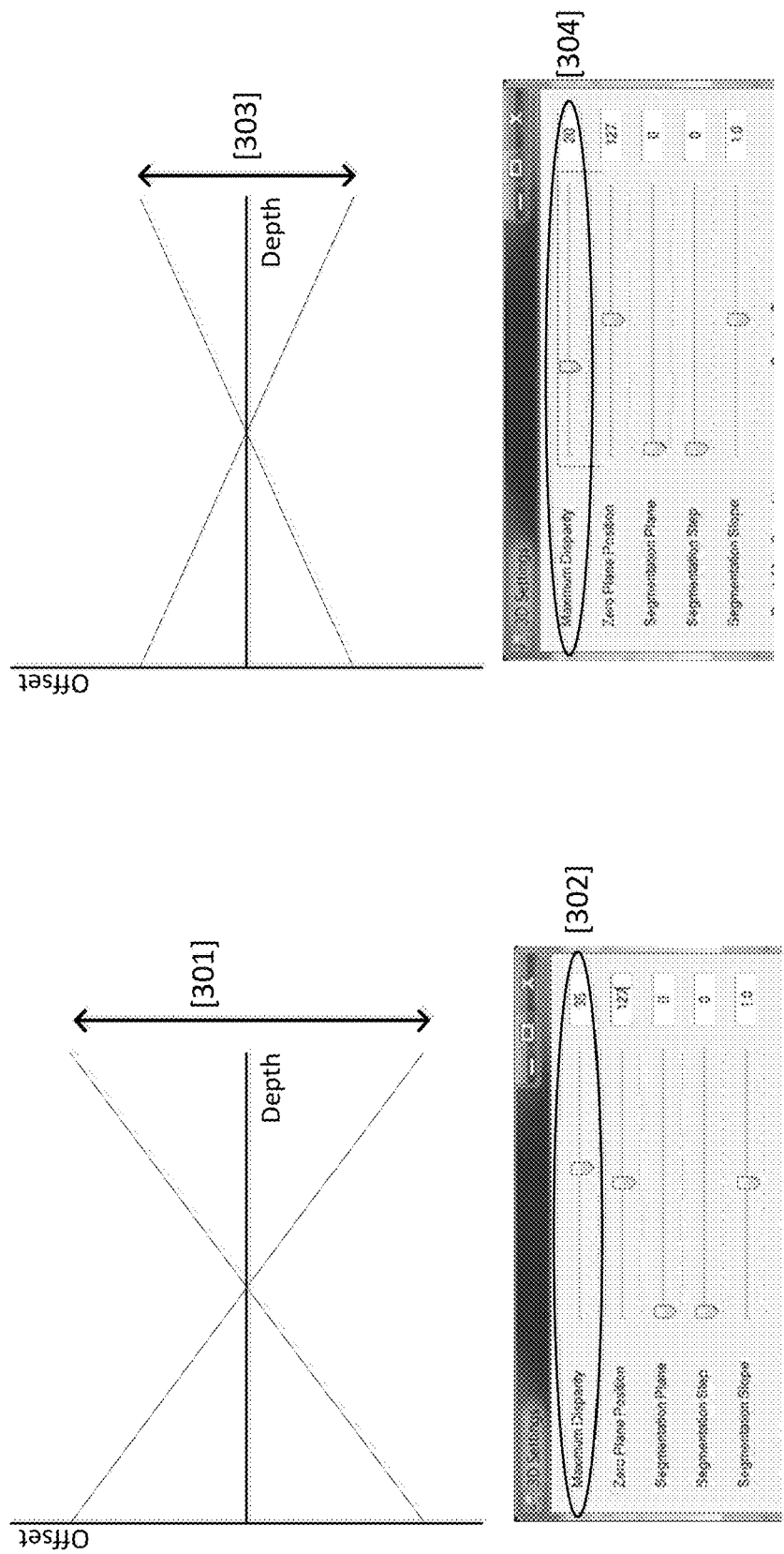
FIG. 4 illustrates a graphical user interface (GUI) for user to control depth volume, according to one embodiment of the invention.

FIG. 4 illustrate one embodiment of graphical user interface (GUI) 302 to enable user adjust the amount of depth in the 3D-image by adjusting the amount of disparity produced between the left and right eye view. GUI 304 sows a lower value for disparity. As shown by comparing 301 and 303, the lower values result in less depth.

Figure 5:
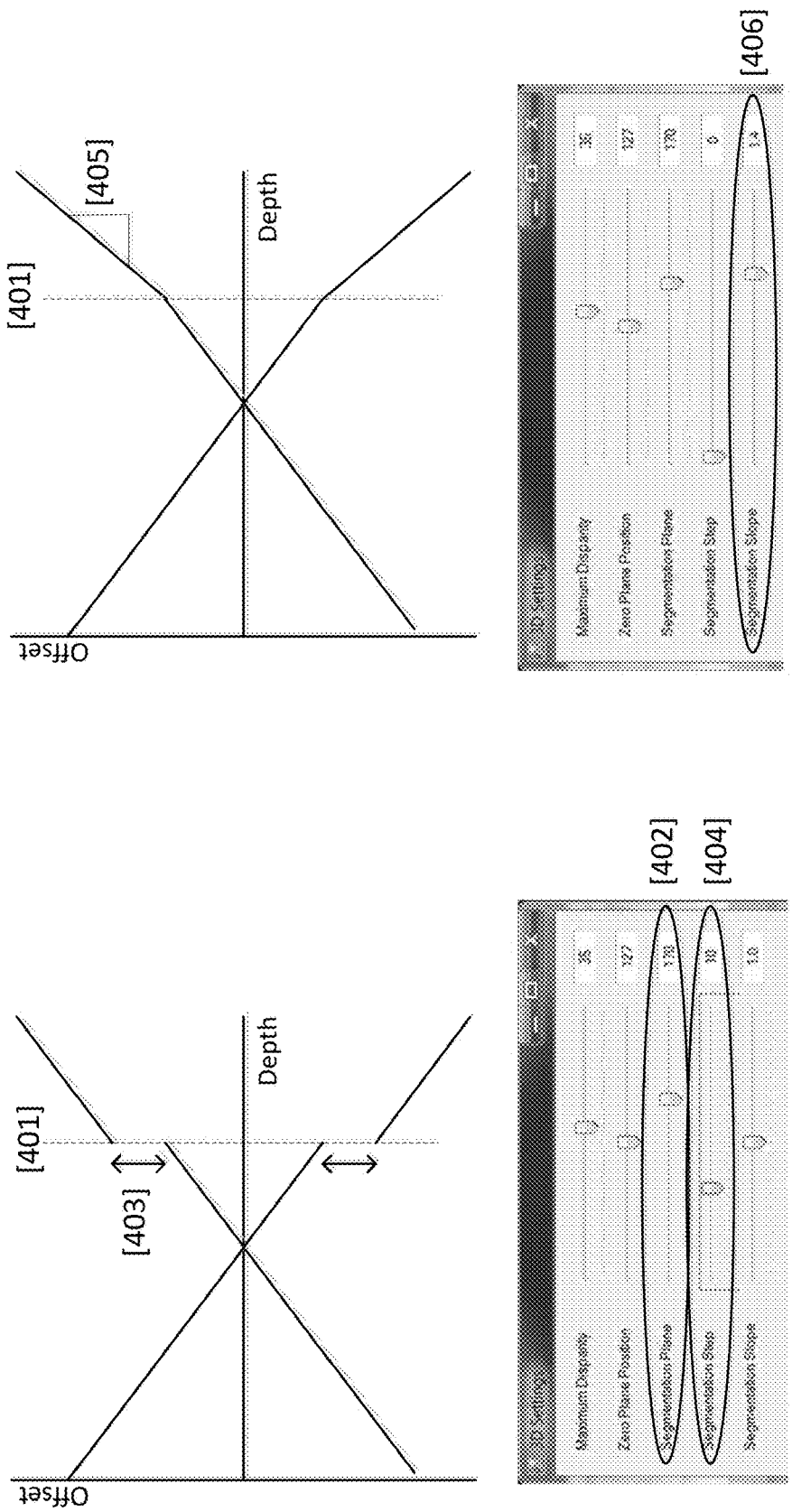
FIG. 5 illustrates an exemplary method for exaggerating depth by adding a step offset for all depths equal or greater than a user defined value, according to one embodiment of the invention. In another embodiment, the slope of the depth to offset function is modified to exaggerate the 3D-effect.

FIG. 5 illustrates two embodiments of graphical user interface (GUI) consisting of controls 402, 404 and 406 that enable user to artificially separate objects selectively from background objects and pop it out. A step offset value 403 is used in one embodiment. A scaled slope 405 is used in another embodiment. The depth location where the offset or slope scaling is indicated by 401 and is controlled by the GUI control 402.

Figure 6:
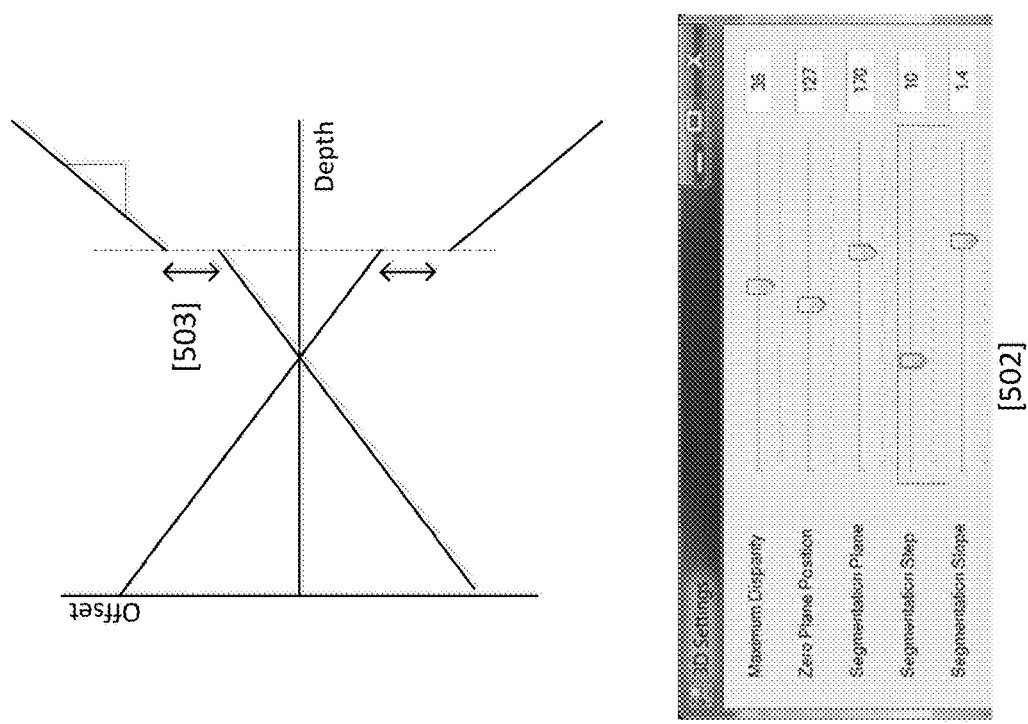
FIG. 6 illustrates an exemplary method for exaggerating depth by adding a step offset and scaling the slope of the depth to offset function for all depths equal or greater than a user defined value, according to one embodiment of the invention.

FIG. 6 illustrates one embodiment of graphical user interface (GUI) where both step and slope scale is applied simultaneously. The GUI 502 with the values shows results in the representation shown as 503.

Figure 7:
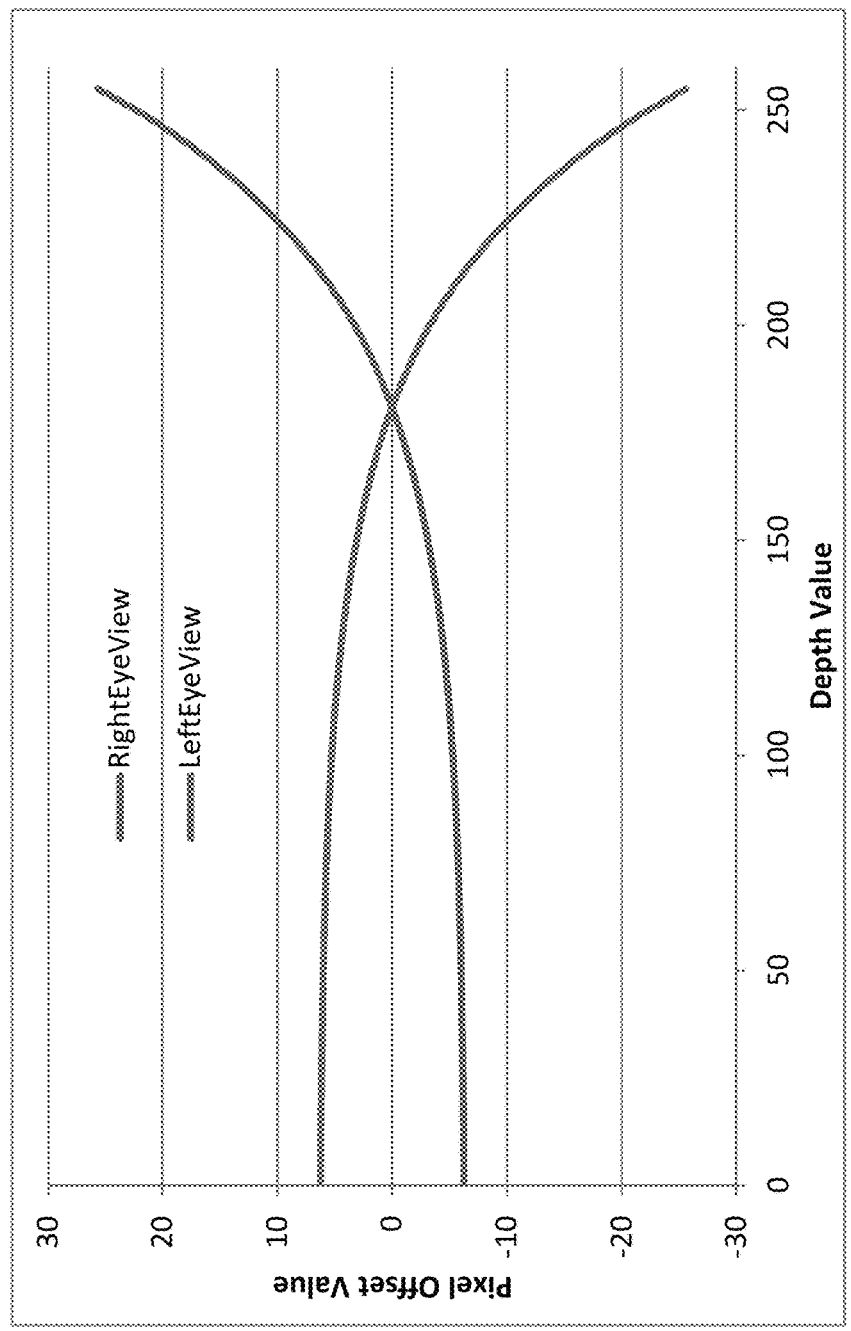
FIG. 7 illustrates yet another exemplary method for exaggerating depth by using an exponential transfer function for depth to offset, according to one embodiment of the invention.

FIG. 7 illustrates one embodiment where the depth to offset transformation is exponential. This creates an effect where all the background objects are squished flat, while the objects in the foreground have increasingly exaggerated depth and/or pop-out. In general, the exponential function can be replaced by any nonlinear, monotonic function to create special 3D-effects.

Figure 8:
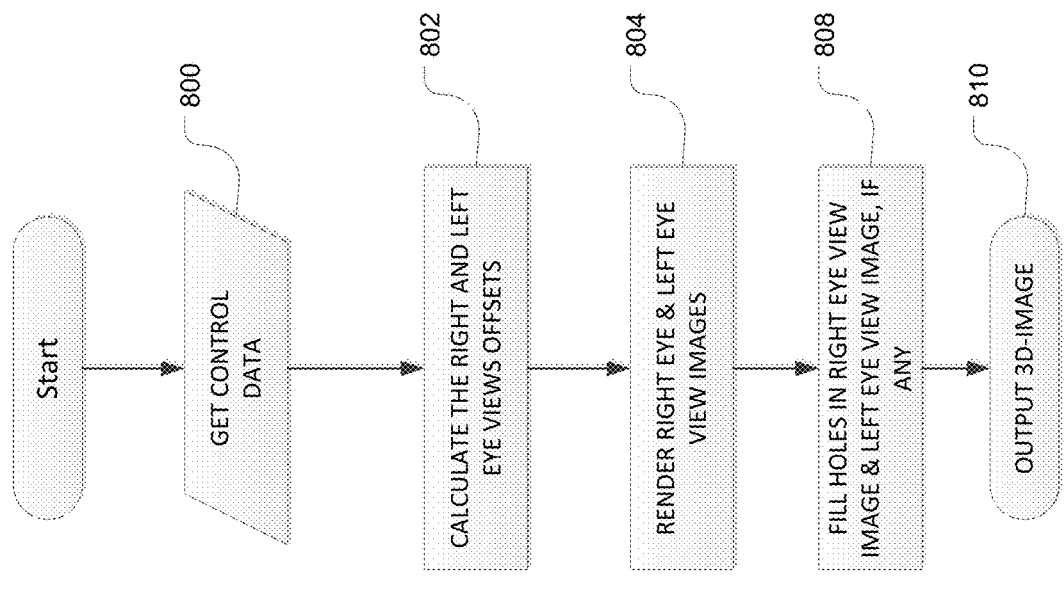
FIG. 8 illustrates an exemplary flow chart for rendering exaggerated 3D image, given a 2D image source and its depth map, according to one embodiment of the invention.

FIG. 8 illustrates one embodiment of a flowchart for enhanced 3D-render method. At 800, the process obtains the control data needed for the further processing. This data may include maximum disparity, zero plane position, and the segmentation type, amount and location. At 802, the process calculates the offset for the right and left eye views using the pixel depth from the depth map and the control data. At 804, the process renders the right and left eye view using the offsets for each pixel.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description.

What is claimed is:

1. A method for adjusting and generating enhanced 3D-effects for real time and offline 2D to 3D image and video conversion applications consisting of:
   (a) selectively controlling a depth location of a zero parallax plane within a depth field of an image scene to adjust parallax of objects in the image scene;
   (b) selectively controlling a depth volume of objects in the image scene to one of either exaggerate or reduce 3D-effect of the image scene;
   (c) selectively controlling a depth location of a segmentation plane within the depth field of the image scene, wherein said depth location is a non-zero depth location, dividing the objects in the image scene into a foreground group and a background group based on a location of the objects relative to the segmentation plane wherein an object of said foreground group is in said background group when said depth location of said segmentation plane is moved forward and wherein an object of said background group is in said foreground group when said depth location of said segmentation plane is moved backward, wherein said segmentation plane is moved from a zero location to a different location where as a result of moving said segmentation plane to said different location at least one of,
      (i) objects that were in said foreground group when said segmentation plane was at said zero location are moved to said background group when said segmentation plane is moved to said different location, and;
      (ii) objects that were in said background group when said segmentation plane was at said zero location are moved to said foreground group when said segmentation plane is moved to said different location;
   (d) selectively increasing or decreasing depth volume of objects in the foreground group independently of selectively increasing or decreasing depth volume of objects in the background group, wherein said depth volume of objects in said foreground group is modified to change available foreground volume in which objects to be rendered are mapped, wherein said depth volume of objects in said background group is modified to change available background volume in which objects to be rendered are mapped,
      (i) wherein objects that were in said foreground group when said segmentation plane was at said zero location that are moved to said background group when said segmentation plane is moved to said different location are said selectively increased or decreased in said depth volume as objects in said background group, and
      (ii) wherein objects that were in said background group when said segmentation plane was at said zero location that are moved to said foreground group when said segmentation plane is moved to said different location are said selectively increased or decreased in said depth volume as objects in said foreground group;
   (e) selectively increasing or decreasing depth separation of objects in the foreground group relative to the objects in the background group, where said separation includes both a step offset and a slope scaling, wherein said step offset and said slope scaling is relative to said available foreground volume being fixed, wherein said step offset and said slope scaling is relative to said available background volume being fixed, wherein objects in said foreground group and said background group include a continuous range of available depths prior to said selectively increasing or decreasing said depth separation of objects in said foreground group relative to said objects in said background group and wherein objects in said foreground group and said background group include a discontinuous range of available depths after said selectively increasing or decreasing said depth separation of objects in said foreground group relative to said objects in said background group, wherein said discontinuous range includes a prohibited range of depths within said continuous range of available depths being said step offset;
   (f) generating an updated depth map file for a 2D-image based upon the controlling the depth location, the controlling the depth volume, the increasing and decreasing depth volume, and the increasing and decreasing depth separation;
   (g) rendering an enhanced 3D-image using the updated depth map.

2. The method of claim 1, wherein the method further comprises a software application running on a computing device.

3. The method of claim 2, wherein the computing device comprises one of a server computer, personal computer, tablet computer or smart-phone, graphics processor unit.

4. The method of claim 1, further comprising receiving a 2D-still image or a streaming 2D-video from a network with an associated depth map.

5. The method of claim 1, further comprising reading a 2D-still image or a 2D-video from a file stored on a local or remote storage device with the associated depth map image.

6. The method of claim 1, further comprising generating a depth map for each 2D-still image or a sequence of depth maps for each frame in a 2D-video.

7. The method of claim 1, further comprising reading meta-instructions for depth map enhancement for the 2D-image or video from a file stored on a local or remote storage device.

8. The method of claim 1, further comprising enabling a user to enhance the depth map through one of a set of graphical user interfaces (GUI), command line instructions, and custom input devices.

9. The method of claim 1, wherein rendering a 3D image comprises one of rendering an anaglyph, stereo-3D or auto-stereo 3D using the enhanced depth map.

10. The method of claim 1, further comprising one of displaying generated 3D image or video on and attached 3D display in real time, and storing the 3D image on local or remote storage device(s) for offline viewing.

11. The method of claim 1, further comprising storing the generated enhanced depth map as grey scale images on a storage device.

12. The method of claim 1, further comprising storing user modifications of the depth map as a sequence of instructions associated with each image in a control file using a pre-defined syntax.

13. The method of claim 1, wherein the method is executed by a dedicated hardware device.

14. The method of claim 1, wherein the method is executed by hardware contained in a stand-alone converter box.

15. The method of claim 1, wherein the method is implemented as one of a circuit board, a daughter card or any other plug-in card or module.

* * * * *

UNITED STATES PATENT AND TRADEMARK OFFICE
CERTIFICATE OF CORRECTION

| | | |
|---|---|---|
| PATENT NO. | : 10,250,864 B2 | Page 1 of 1 |
| APPLICATION NO. | : 15/855756 | |
| DATED | : April 2, 2019 | |
| INVENTOR(S) | : Javed Sabir Barkatullah | |

It is certified that error appears in the above-identified patent and that said Letters Patent is hereby corrected as shown below:

In the Specification

At Column 3, Line 2: Change "done in real." to read --done in real time.--

Signed and Sealed this
Eighteenth Day of August, 2020

Andrei Iancu
*Director of the United States Patent and Trademark Office*